C. M. ZIMMERMAN.
GLUE MELTING APPARATUS.
APPLICATION FILED DEC. 7, 1909.
961,570.
Patented June 14, 1910.
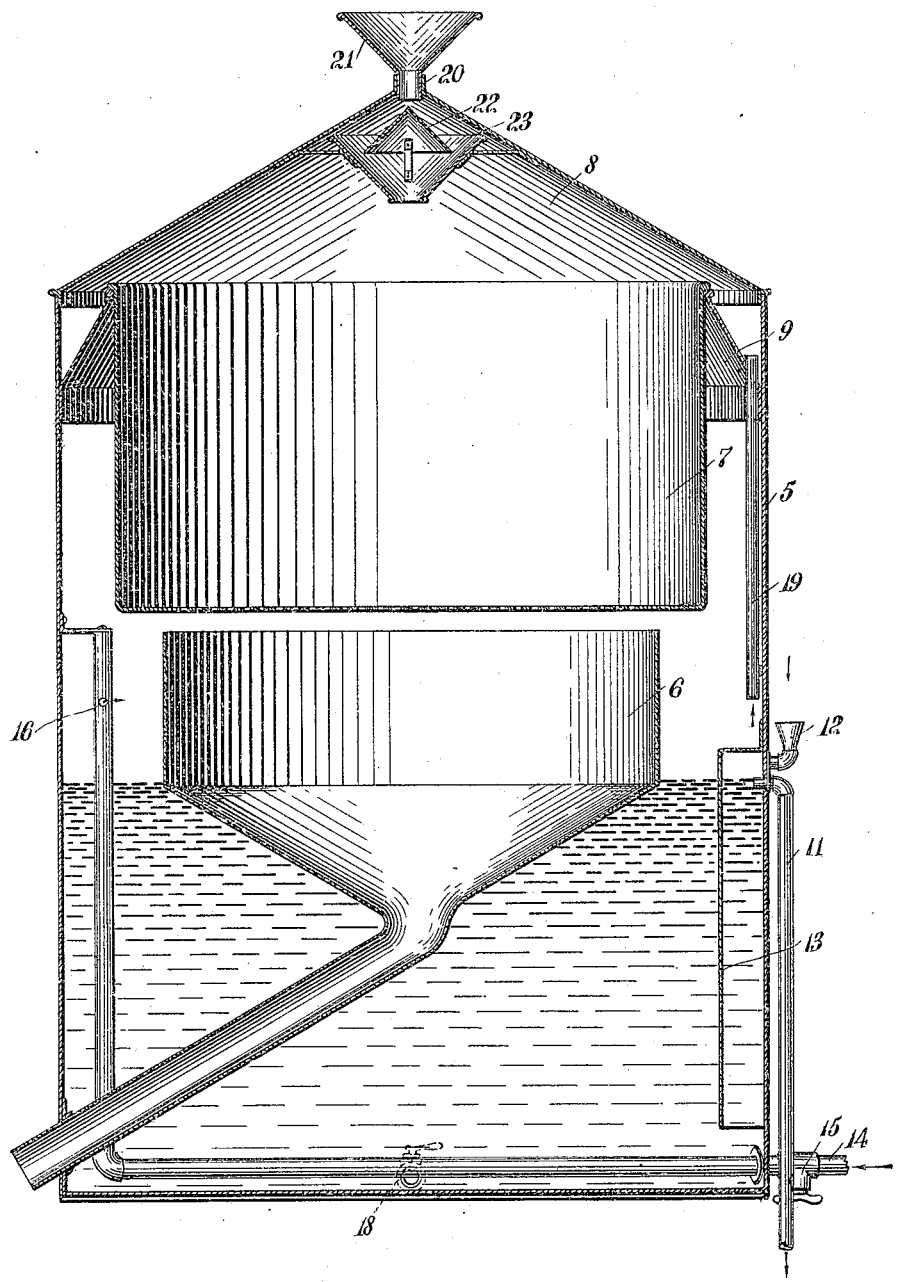
WITNESSES:
INVENTOR
Charles M. Zimmerman
BY
ATTORNEYS

UNITED STATES PATENT OFFICE.

CHARLES MOSER ZIMMERMAN, OF CINCINNATI, OHIO.

GLUE-MELTING APPARATUS.

961,570.

Specification of Letters Patent. Patented June 14, 1910.

Application filed December 7, 1909. Serial No. 531,862.

*To all whom it may concern:*

Be it known that I, CHARLES M. ZIMMERMAN, a citizen of the United States, and a resident of Cincinnati, in the county of Hamilton and State of Ohio, have invented a new and Improved Glue-Melting Apparatus, of which the following is a full, clear, and exact description.

The invention is an improved apparatus for the melting of glue, and belongs to the general type of such appliances as disclosed in applications filed by me October 29, 1908, and October 29, 1909, Serial Numbers 460,144 and 525,351, respectively, said appliances embodying a steam vessel in which is located a glue converter and a glue collector, the converter having a perforated or reticulated bottom through which the glue is discharged to the collector beneath.

The present invention has for its purpose to collect and heat water in the lower portion of the steam vessel for use in keeping small glue pots hot, to maintain a predetermined water level without the loss of steam, to prevent water from the steam pipe being blown into the collector or water of condensation running into the collector from the sides of the converter, and to provide for the passage of chilled glue from the glue pots into the apparatus and its reheating before dropping into the converter.

Reference is to be had to the accompanying drawing, wherein is shown in central vertical section a glue-melting apparatus embodying my invention.

The apparatus comprises a steam vessel 5, a collector 6, a converter or melting vessel 7, a cover 8 and an upwardly and inwardly inclined wall 9 secured to and forming in connection with the upper portion of the vessel, a gutter, and on which the converter removably seats; all of which are features of the apparatus disclosed in my applications last referred to.

The steam vessel of the present apparatus is made sufficiently long to provide for the collection and heating of water in the lower portion for use in the outer jackets of small glue pots to keep the glue in the latter from readily chilling. The water level is maintained some distance below the top of the glue collector 6, generally at or about the level of the funnel bottom portion of this part of the appliance, by an overflow pipe 11 and a filling pipe or funnel 12, each communicating with the vessel at points closely adjacent and connecting with a pipe 13, the latter extending a substantial distance below the water level, generally terminating a short distance above the bottom of the steam vessel, thus permitting of the escape of the water from the steam vessel, when the water level rises above the inlet, to the overflow pipe, or the introduction of water into the steam vessel, should additional water be required, without the escape of the steam at these points.

A pipe 14 from a suitable source of supply has a trap 15 adjacent to the vessel and passes within the vessel near the bottom and terminates in a vertical portion a substantial distance above the water level, the upper end of the pipe being closed and having perforations 16 a short distance therebelow for the distribution of steam in the steam vessel to both sides, the perforations being arranged intermediate the water level and top of the glue collector, so that the water of condensation in the pipe will not be blown into the collector, nor will the water within the steam vessel pass into the steam pipe through the perforations.

The side walls of the glue converter or melting vessel are arranged outwardly from the open upper end of the collector, so that the water running down the converter by reason of the condensed steam will not pass into the collector, the perforations in the bottom of the converter being confined to the space directly over the collector, as shown, so that all of the glue as it melts will pass into the collector, the collector discharging through the side of the steam vessel adjacent to the bottom. The hot water in the steam vessel when needed for the jackets of the glue pots is drawn off through a faucet 18, shown in dotted outline to be arranged at the side of and near the bottom of the steam vessel.

The cover 8 is preferably of conical form so that the water of the condensed steam will flow down the sides into the gutter, from which the water is led off to a point below the collector by a pipe 19. The cover 8 at its apex has a tubular extension 20 for the insertion of a funnel 21, and below said extension has a conical hood or member 22 pointing upwardly and shedding into a larger conical member or funnel 23 reversely arranged and discharging over the converter, the members 22 and 23 affording a large heating surface and serving to readily reheat the chilled glue when the latter is poured from the glue pots into the funnel 21.

In operation, the glue to be melted is placed within the converter 7 and the latter seated in the steam vessel, when the cover is applied and the steam turned on. The steam pipe passing through the water in the lower portion of the steam vessel keeps the water sufficiently hot for the purpose intended, the water being constantly added to by the condensation of the steam, which, if insufficient to keep the water level up to the overflow pipe, is added to through the inlet pipe or funnel. The glue as it melts passes into the collector, from which it flows to the outside of the vessel.

Having thus described my invention, I claim as new and desire to secure by Letters Patent:

1. The combination of a steam vessel, a glue collector arranged within the vessel and discharging to the outside thereof, a glue converter arranged within the vessel over the top of the collector and discharging thereinto, and means to maintain a head of water in the lower portion of the vessel, with the normal level thereof located below the top of the collector.

2. The combination of a vessel, a glue collector arranged within the vessel, a glue converter arranged within the vessel over the collector and discharging thereinto, means to maintain a head of water within the lower portion of the vessel, and a steam pipe passing into the vessel below the normal water level and discharging at a point intermediate said level and the top of the collector.

3. The combination of a vessel, a glue collector arranged within the vessel, a glue converter arranged within the vessel over the collector and discharging thereinto, and a steam pipe passing into the lower portion of the vessel and terminating in a vertical portion, with the upper end thereof closed and having a discharge perforation arranged in the side below the top of the collector.

4. The combination of a steam vessel, a glue collector arranged within the vessel, a glue converter arranged within the vessel above the collector and discharging therein, a water overflow pipe leading from the vessel at a point a substantial distance above the bottom thereof and below the top of the collector, and means covering the inlet of the overflow pipe, extending a substantial distance below the normal water level and open at the lower portion thereof.

5. The combination of a steam vessel, a glue collector arranged within the vessel, a glue converter arranged within the vessel over the collector, means to maintain a head of water in the lower portion of the vessel, an inlet pipe discharging into the vessel near the normal water level, and a cover closing the inlet end of the pipe, extending a substantial distance below the water level and open at the lower portion thereof.

6. The combination of a steam vessel, a glue collector arranged in the vessel and open at the top, and a glue converter arranged over the collector and having a perforated bottom arranged to discharge into the collector, with the sides of the converter arranged outwardly from the open upper end of the collector.

7. The combination of a steam vessel, a glue converter arranged within the vessel, a cover for the vessel, heating members discharging into the converter and arranged under the cover, and means for introducing glue through the cover over the heating members.

8. The combination of a steam vessel, a glue converter arranged within the vessel, a cover for the vessel, a funnel carried by the cover at the inner side thereof and discharging into the converter, a conical heating member shedding into the funnel, and means to introduce glue through the cover over said member.

9. The combination of a steam vessel, a perforated glue converter removably arranged in the upper portion of the vessel and substantially cutting off the passage of the steam thereabove except through the perforations thereof, and a glue collector arranged under the converter within and surrounded by the vessel and discharging to the outside thereof.

In testimony whereof I have signed my name to this specification in the presence of two subscribing witnesses.

CHARLES MOSER ZIMMERMAN.

Witnesses:
ARTHUR E. GEORGI,
MINNIE KLOTZBACH.